United States Patent
Lee

(10) Patent No.: US 12,438,418 B2
(45) Date of Patent: Oct. 7, 2025

(54) DUAL MOTOR ACTUATOR AND METHOD OF CONTROLLING THE SAME

(71) Applicant: KOREA AEROSPACE RESEARCH INSTITUTE, Daejeon (KR)

(72) Inventor: Jung Jin Lee, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 218 days.

(21) Appl. No.: 18/330,700

(22) Filed: Jun. 7, 2023

(65) Prior Publication Data
US 2023/0412048 A1    Dec. 21, 2023

(30) Foreign Application Priority Data
Jun. 21, 2022    (KR) .................. 10-2022-0075689

(51) Int. Cl.
| | | |
|---|---|---|
| *H02K 7/10* | (2006.01) | |
| *H02K 7/116* | (2006.01) | |
| *H02K 7/20* | (2006.01) | |
| *H02P 5/48* | (2016.01) | |

(52) U.S. Cl.
CPC .............. *H02K 7/20* (2013.01); *H02K 7/116* (2013.01); *H02P 5/48* (2013.01)

(58) Field of Classification Search
CPC . H02K 7/20; H02K 7/10; H02K 7/116; H02K 2213/06; H02P 5/48
USPC ....................................................... 318/46
See application file for complete search history.

(56) References Cited

U.S. PATENT DOCUMENTS

| | | | | |
|---|---|---|---|---|
| 6,886,647 | B1* | 5/2005 | Gotta .................. | B60L 15/2009 180/65.285 |
| 11,807,980 | B2* | 11/2023 | Hull ...................... | H02K 16/00 |
| 2005/0120814 | A1* | 6/2005 | Jastrzembowski ... | F16D 41/066 74/7 E |
| 2007/0261901 | A1* | 11/2007 | Janson ................. | B60W 10/10 903/907 |
| 2011/0198163 | A1* | 8/2011 | Hanlon ................ | B60T 13/746 188/72.8 |
| 2012/0253556 | A1 | 10/2012 | Noll et al. | |

(Continued)

FOREIGN PATENT DOCUMENTS

| | | |
|---|---|---|
| KR | 101951642 | 2/2019 |
| KR | 20200058827 | 5/2020 |

OTHER PUBLICATIONS

Steering Controller (Year: 1998).*

*Primary Examiner* — Gabriel Agared
(74) *Attorney, Agent, or Firm* — Perman & Green, LLP

(57) ABSTRACT

A dual motor actuator according to an embodiment includes a main motor actuator outputting torque to a main output shaft by including a main motor and a main reduction gear, an auxiliary motor actuator outputting torque to an auxiliary output shaft by including an auxiliary motor and an auxiliary reduction gear, and a clutch connecting the main output shaft and the auxiliary output shaft to each other, wherein the clutch includes a fixed clutch connected to the main output shaft and a movable clutch coupled to or released from the fixed clutch and connected to the auxiliary output shaft, and the dual motor actuator further includes an output unit connected to the movable clutch and transmitting an output from the main motor actuator or the auxiliary motor actuator.

10 Claims, 7 Drawing Sheets

(56) References Cited

U.S. PATENT DOCUMENTS

| | | | |
|---|---|---|---|
| 2015/0141191 A1* | 5/2015 | Zhang | F16H 3/44 475/329 |
| 2016/0348778 A1* | 12/2016 | Erhart | F16H 37/0826 |
| 2017/0259915 A1* | 9/2017 | Cremiere | F16D 21/02 |
| 2023/0170829 A1* | 6/2023 | Schaede-Bodenschatz | H02P 5/48 307/84 |
| 2023/0366454 A1* | 11/2023 | Davies | F16H 3/10 |

* cited by examiner (a)

(b)

DUAL MOTOR ACTUATOR AND METHOD OF CONTROLLING THE SAME

CROSS-REFERENCE TO RELATED APPLICATION

This application is based on and claims priority under 35 U.S.C. § 119 to Korean Patent Application No. 10-2022-0075689, filed on Jun. 21, 2022, in the Korean Intellectual Property Office, the disclosure of which is incorporated by reference herein in its entirety.

BACKGROUND

1. Field

The disclosure relates to a dual motor actuator and a method of controlling the same, the dual motor actuator being capable of increasing the reliability of a system by securing a fault tolerance due to driving of the other motor actuator when one motor actuator fails.

2. Description of the Related Art

A motor actuator is a system driven by a motor, a reduction gear, and an output shaft. A dual motor actuator may be configured using duplexing actuators or duplexing only motors.

Even when one motor actuator or motor fails, a dual motor actuator provides increased reliability to a system by securing fault tolerance by driving the other motor actuator or motor. To increase the reliability of a system that operates continuously for a long time, dual motor actuators including three or more motors have been developed.

In particular, dual motor actuators are applied to autopilots for manned aircrafts or unmanned aerial vehicles to secure flight stability and high reliability of aircrafts. Furthermore, the dual motor actuator are designed to have failure tolerance in case of failure of each motor actuator by performing failure diagnosis. In particular, as the design reliability of unmanned aerial vehicles increases to the level of manned aircrafts, a flight control device tends to be designed to include dual-or-more-motor actuators instead of a single system.

FIG. 1 is a conceptual diagram of a dual motor actuator in the related art. Referring to FIG. 1, the dual motor actuator in the related art includes a first motor 1, a second motor 2, a reduction gear 3, and an output shaft 4. When failure of the first motor 1 occurs, the second motor 2, the reduction gear 3, and the output shaft 4 are auxiliary driven. When the first motor 1 is driven, a shaft of the second motor 2 rotates idly, and when the first motor 1 fails, the shaft of the first motor 1 rotates idly, and the second motor 2 is driven. However, when a motor shaft does not move due to an internal mechanical defect of a motor or when a defect occurs in the reduction gear 3, the dual motor actuator lose their functions because the second motor 2 is not driven.

As a supplementary measure, a configuration in which a reduction gear and a clutch are connected to each motor and two clutches are connected to a link to the output has been proposed, but in this case, compared to the dual motor actuator of FIG. 1, a torque output is lowered, the weight is increased, and the cost greatly increases due to the addition of the clutches.

Therefore, it is necessary to develop a dual motor actuator that does not excessively increase the weight and cost while having improved reliability.

The foregoing background art is technical information that the inventor possessed for derivation of the disclosure or acquired during the derivation process of the disclosure, and cannot necessarily be said to be known art disclosed to the general public prior to filing the disclosure.

SUMMARY

Provided are a dual motor actuator and a method of controlling the same, the dual motor actuator having improved reliability, small configurations, and not excessively increased weight and cost.

However, these objects are examples, and the objects are not limited thereto.

Additional aspects will be set forth in part in the description which follows and, in part, will be apparent from the description, or may be learned by practice of the presented embodiments of the disclosure.

Provided are a dual motor actuator and a method of controlling the same.

According to an aspect of the disclosure, a dual motor actuator includes a main motor actuator outputting a torque to a main output shaft by including a main motor and a main reduction gear, an auxiliary motor actuator outputting a torque to an auxiliary output shaft by including an auxiliary motor and an auxiliary reduction gear, and a clutch connecting the main output shaft and the auxiliary output shaft to each other, wherein the clutch includes a fixed clutch connected to the main output shaft and a movable clutch coupled to or released from the fixed clutch and connected to the auxiliary output shaft, and the dual motor actuator further includes an output unit connected to the movable clutch and transmitting an output from the main motor actuator or the auxiliary motor actuator.

Also, a capacity of the main motor may be greater than a capacity of the auxiliary motor.

Also, the fixed clutch may include a tooth clutch, and may be coupled to the movable clutch in a tooth-like engagement structure.

In addition, the dual motor actuator may further include a base on which the main motor actuator and the auxiliary motor actuator are installed.

Also, when the main motor actuator fails, the movable clutch may be released from the fixed clutch, and the auxiliary motor actuator may be driven.

In addition, the dual motor actuator may further include an angular displacement gauge measuring an angular displacement of the output unit, and the auxiliary motor actuator may be controlled by an angular displacement of the output unit measured by the angular displacement gauge.

Also, the main motor actuator may be determined to be a failure when an error angle and a rate of change of the error angle are greater than set values, wherein the error angle is a difference between an angular displacement input to the main motor and an angular displacement measured by the angular displacement gauge.

In addition, a torque output of the main motor and a torque output of the auxiliary motor may be set according to an equation below.

$$T_1 = T_2 + (J_C + J_2)\dot{\omega}$$

(where, $T_1$: a torque output of the main motor actuator, $T_2$: a torque output of the auxiliary motor actuator, $J_C$: a mass moment of inertia of the clutch, and $J_2$: a mass moment of inertia of the auxiliary reduction gear)

Also, the main motor actuator and the auxiliary motor actuator may be installed in a direction in which the main output shaft and the auxiliary output shaft face each other.

In addition, the main motor actuator and the auxiliary motor actuator may be installed in a direction in which the main output shaft and the auxiliary output shaft are parallel to each other.

Also, the movable clutch may include a guide shaft receiving and outputting torque from the main output shaft, and the output unit may include a main output link connected to the guide shaft, an auxiliary output link connected to the auxiliary output shaft, and a connection link connecting the main output link and the auxiliary output link to each other.

In addition, the guide shaft may be installed to be supported on the base by a bearing.

According to another aspect of the disclosure, a method of controlling a dual motor actuator includes applying power to a clutch and operating a main motor actuator with an input angular displacement, measuring an angular displacement of an output unit connected to the clutch to determine whether the main motor actuator fails, and cutting off the power to the clutch and operating an auxiliary motor actuator connected to the clutch when it is determined that the main motor actuator fails, wherein the auxiliary motor actuator is controlled by the angular displacement of the output unit.

Also, the method may further include calculating an error angle and a rate of change of the error angle, wherein the error angle is a difference between an angular displacement input to the main motor actuator and an angular displacement of the output unit, and determining that the main motor actuator fails when the error angle and the rate of change of the error angle are greater than set values.

Other aspects, features, and advantages other than those described above will become clear from the detailed description, claims, and drawings for carrying out the disclosure below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
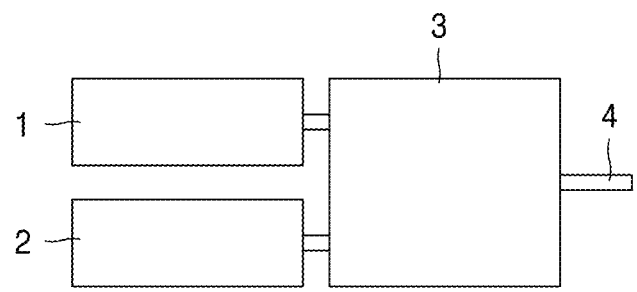
FIG. 1 is a conceptual diagram of a dual motor actuator in the related art.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope are encompassed in the disclosure. In describing the disclosure, even if shown in different embodiments, the same reference numerals are used for the same components.

Hereinafter, the disclosure will be described in detail by explaining embodiments of the disclosure with reference to the attached drawings. Like reference numerals in the drawings denote like elements, and redundant descriptions thereof are omitted.

In the following embodiments, while such terms as "first," "second," etc., may be used to describe various components, such components must not be limited to the above terms. The above terms are used only to distinguish one component from another.

In the following embodiments, an expression used in the singular encompasses the expression of the plural, unless it has a clearly different meaning in the context.

In the following embodiments, it is to be understood that the terms such as "including," "having," and "comprising" are intended to indicate the existence of the features or components disclosed in the specification, and are not intended to preclude the possibility that one or more other features or components may exist or may be added.

Sizes of components in the drawings may be exaggerated for convenience of explanation. In other words, since sizes and thicknesses of components in the drawings are arbitrarily illustrated for convenience of explanation, the following embodiments are not limited thereto.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

The terms used in the disclosure are merely used to describe particular embodiments, and are not intended to limit the disclosure. In the disclosure, it is to be understood that the terms such as "including," "having," and "comprising" are intended to indicate the existence of the features, numbers, steps, actions, components, parts, or combinations thereof disclosed in the disclosure, and are not intended to preclude the possibility that one or more other features, numbers, steps, actions, components, parts, or combinations thereof may exist or may be added.

In the description and claims of the disclosure, a dual motor actuator means an actuator that uses two motors to produce one output. A dual motor actuator including three or more motors also include two motors, and thus may be included in the scope of the dual motor actuator described herein.

In addition, in the disclosure, a main motor actuator may be understood to include a first main motor actuator 110 of a first embodiment and a second main motor actuator 210 of a second embodiment. Similarly, a main output shaft, an auxiliary motor actuator, an auxiliary output shaft, a clutch, a fixed clutch, a movable clutch, a clamping unit, a base, an angular displacement gauge may also be understood as a concept including components referred to as 'first' and 'second' in each embodiment.

Hereinafter, particular embodiments of the disclosure are described in detail with reference to the drawings.

Figure 2:
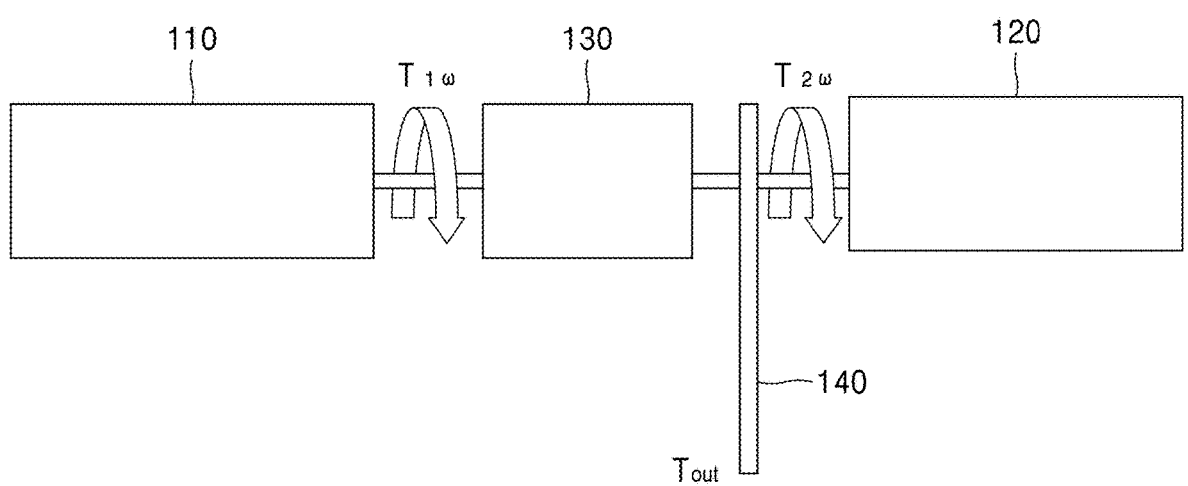
FIG. 2 is a conceptual diagram of a first dual motor actuator according to an embodiment.
Figure 3:
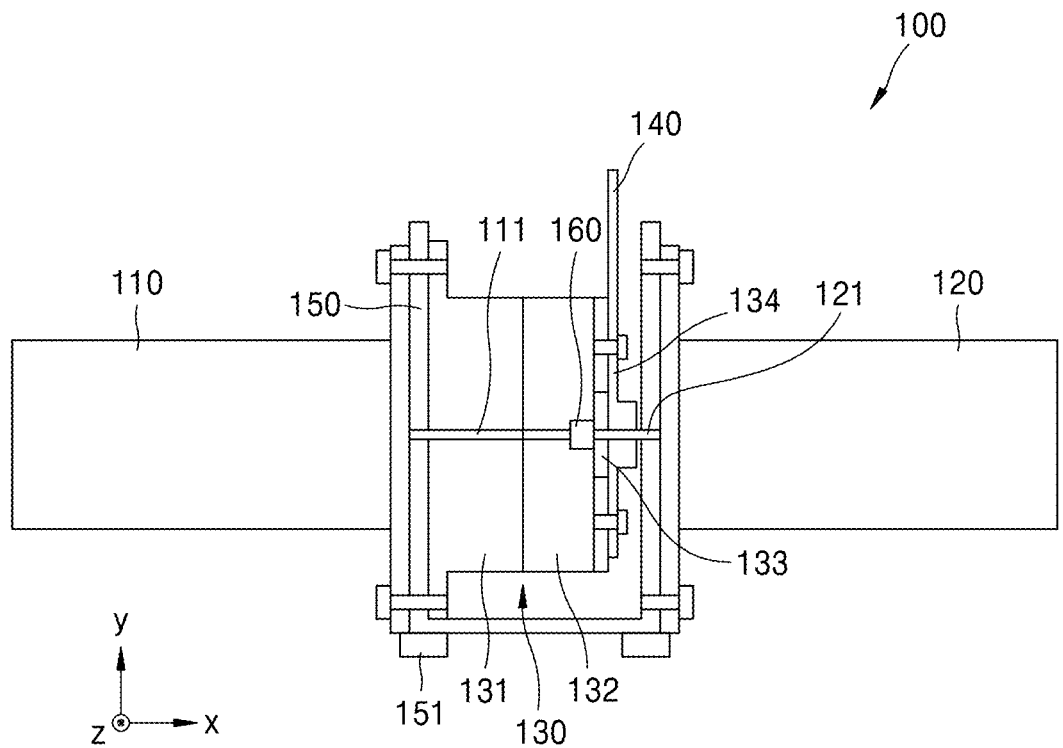
FIG. 3 is a detailed view of a first dual motor actuator according to an embodiment.

FIG. 2 is a conceptual diagram of a first dual motor actuator 100 according to an embodiment, and FIG. 3 is a detailed view of the first dual motor actuator 100 according to the embodiment. Referring to FIGS. 2 and 3, the first dual motor actuator 100 according to an embodiment may include the first main motor actuator 110, a first auxiliary motor actuator 120, a first clutch 130, and a first output unit 140. The first main motor actuator 110 includes a main motor and a main reduction gear to transmit torque through a first main output shaft 111, and the first auxiliary motor actuator 120 includes an auxiliary motor and an auxiliary reduction gear to transmit torque through a first auxiliary output shaft 121. The first clutch 130 has one side connected to the first main motor actuator 110 and another side connected to the first auxiliary motor actuator 120. Also, the first clutch 130 may be selectively connected to the first main motor actuator 110 or the first auxiliary motor actuator 120 according to the coupling or release of the first clutch 130. Although the first clutch 130 is simultaneously connected to a main reduction gear of the first main motor actuator 110 and an auxiliary reduction gear of the first auxiliary motor actuator 120, output shafts of a main motor and an auxiliary motor may idly rotate in a no-load state without being driven, and thus only a reduction gear rotates when a motor does not operate.

Referring to FIG. 2, the first main motor actuator 110 is controlled by a torque output $T_1$ and an angular velocity $\omega$, and the first clutch 130 is connected to a first output shaft of the first main motor actuator 110 and transmits torque through the first output unit 140. In addition, when the first main motor actuator 110 is not driven due to a failure or the like, the first auxiliary motor actuator 120 is driven and controlled by a torque output $T_2$ and an angular velocity $\omega$. Because the first output unit 140 is connected to the first clutch 130, the first output unit 140 is controlled at the same angular velocity $\omega$ even when driven by either the first main motor actuator 110 or the first auxiliary motor actuator 120.

An equation of motion of a dual motor actuator is as follows.

$$T_1 - (J_C + J_A + J_2)\dot{\omega} = T^1_{out}$$

$$T_2 - J_A \dot{\omega} = T^2_{out}$$

$$T^1_{out} \approx T^2_{out}$$

$$T_1 = T_2 + (J_C + J_2)\dot{\omega}$$

Here, $T_1$ is an output torque of the first main motor actuator 110, $T_2$ is an output torque of the first auxiliary motor actuator 120, $T^1_{out}$ is a torque output of the dual motor actuator by the first main motor actuator 110, $T^2_{out}$ is a torque output of the dual motor actuator by the first auxiliary motor actuator 120, $\dot{\omega}$ is an angular acceleration, $J_C$ is a mass moment of inertia of a clutch, $J_A$ is a mass moment of inertia of a torque arm, that is, the first output unit 140, and $J_2$ is a mass moment of inertia of an auxiliary reduction gear.

Accordingly, a rated torque of the dual motor actuator is $T^1_{out}$, and to achieve $T^1_{out} \approx T^2_{out}$, it is preferred to select a main motor and an auxiliary motor with $T_1 > T_2$.

Referring to FIG. 3, the first dual motor actuator 100 according to an embodiment are then described. The first main motor actuator 110 and the first auxiliary motor actuator 120 may be installed on a first base 150 through a joint bracket 151 so that a main output shaft and an auxiliary output shaft face each other. At this time, the main output shaft and the auxiliary output shaft may be installed to be rotatably supported. A distance between the first main motor actuator 110 and the first auxiliary motor actuator 120 may be fixed by being fixed to the first base 150, and the first clutch 130 and the first output unit 140 may be installed between the first main motor actuator 110 and the first auxiliary motor actuator 120.

The first clutch 130 may be installed to connect the first main output shaft 111 of the first main motor actuator 110 and the first auxiliary output shaft 121 of the first auxiliary motor actuator 120 to each other. The first clutch 130 may include a first fixed clutch 131 connected to the first main output shaft 111 and installed in the first main motor actuator 110, and a first movable clutch 132 coupled to or released from the first fixed clutch 131 and connected to the first auxiliary output shaft 121.

The first fixed clutch 131 and the first movable clutch 132 are driven by an excitation method, and when power supply is supplied, an armature of the first movable clutch 132 is attracted to an electromagnet of the first fixed clutch 131 to transmit power of the first main motor actuator 110, and at this time, the first auxiliary motor actuator 120 idly rotates in a standby state. Also, the first movable clutch 132 includes a wave spring, and when power supply is cut off to the first clutch 130, the first movable clutch 132 is released from the first fixed clutch 131 to transmit power of the first auxiliary motor actuator 120. That is, when the first main motor actuator 110 is driven in a state where the first movable clutch 132 is coupled to the first fixed clutch 131, torque may be output through the first main output shaft 111, the first fixed clutch 131, and the first movable clutch 132. On the contrary, when the first main motor actuator 110 is stopped by being diagnosed as a failure or the like, the first movable clutch 132 may be released from the first fixed clutch 131, the first auxiliary motor actuator 120 may be driven, and torque may be output from the first auxiliary output shaft 121 through the first movable clutch 132.

In addition, the first fixed clutch 131 may be a tooth clutch and may be coupled to the first movable clutch 132 in a tooth-like engagement structure. In the case of a tooth clutch, the tooth clutch has a large torque transmission rate even at high speed due to its small size. The first movable clutch 132 may be supported by the first auxiliary output shaft 121 through a first bearing 133 to be firmly supported between the first main output shaft 111 and the first auxiliary output shaft 121, which face each other. In addition, a first clamping unit 134 may be used for axial support and guide between the first movable clutch 132 and the first auxiliary motor actuator 120.

The first output unit 140 is connected to the first movable clutch 132 and is a final output terminal of the dual motor actuator of the disclosure. The first output unit 140 may be formed as a link, and for example, may be used to control an angle of a wing by being coupled with an aircraft wing or the like.

Also, the first dual motor actuator 100 may include a first angular displacement gauge 160. The first angular displacement gauge 160 is configured to measure an actual angular displacement of the first output unit 140 and may be installed in the first movable clutch 132 or the first output unit 140 as shown in FIG. 3.

Furthermore, the dual motor actuator according to an embodiment may further include a controller diagnosing a failure of the first main motor actuator 110 through the first angular displacement gauge 160. Also, when the first main motor actuator 110 is diagnosed as a failure, the controller may release the first movable clutch 132 from the first fixed clutch 131 and operate the first auxiliary motor actuator 120. Furthermore, when operating the first auxiliary motor actuator 120, the controller may command an early return procedure.

The controller may diagnose a failure by using an angular displacement error angle and a rate of change of an error angle. First, an error angle $e^i$ may be defined as an absolute value of a difference between an angular displacement $\theta_c^1$ input to a main motor and an actual angular displacement $\theta_f$ of the first output unit 140. That is, $e^i=|\theta_c^1-\theta_f|$. A rate of change of an error angle may be defined as $(e^{i+1})/e^i$. When an error angle is greater than a set value A, the controller may determine whether a rate of change of an error angle is greater than a set value B, and diagnose the first main motor actuator 110 as a failure when both of the error angle and the rate of change of the error are respectively greater than the set values A and B. Here, it is preferable that the set value B of the rate of change of the error angle is a number greater than 1. A rate of change of an error angle is used for fault diagnosis because fault may be diagnosed when the error angle is greater than a previous error angle. Failure can be diagnosed even when the error angle increases due to an increase in torque in a normal range, play occurs in a gear inside an actuator, or wear of torque transmission parts occurs. Therefore, a failure may be diagnosed only when an error angle increases.

Furthermore, the controller may control the first auxiliary motor actuator 120 with a feedback value. That is, an angular displacement $\theta_c^2$ output by an auxiliary motor of the first auxiliary motor actuator 120 may be controlled by an actual angular displacement at the time of failure diagnosis. Here, the reason $\theta_c^2$ is a negative number (−) is that the first auxiliary motor actuator 120 is installed in a direction facing the first main motor actuator 110, so that rotation directions are opposite to each other. Here, controlling with the angular displacement $\theta_c$ or $\theta_c^2$ means controlling an auxiliary motor to form an angular displacement on an auxiliary output shaft.

Hereinafter, each configuration of second dual motor actuator 200 according to another embodiment is described. The second dual motor actuator 200 differ from the first dual motor actuator 100 in arrangement of a main motor actuator and an auxiliary motor actuator and configuration related thereto, the same reference numerals are used for the same components, and descriptions thereof are omitted.

Figure 4:
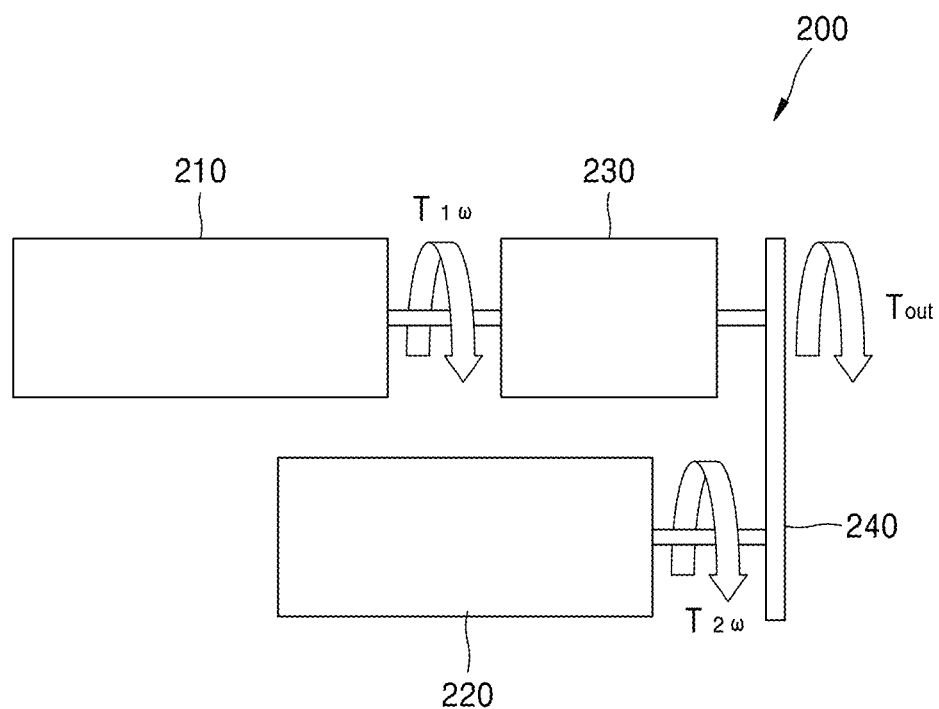
FIG. 4 is a conceptual diagram of a second dual motor actuator according to another embodiment.
Figure 5:
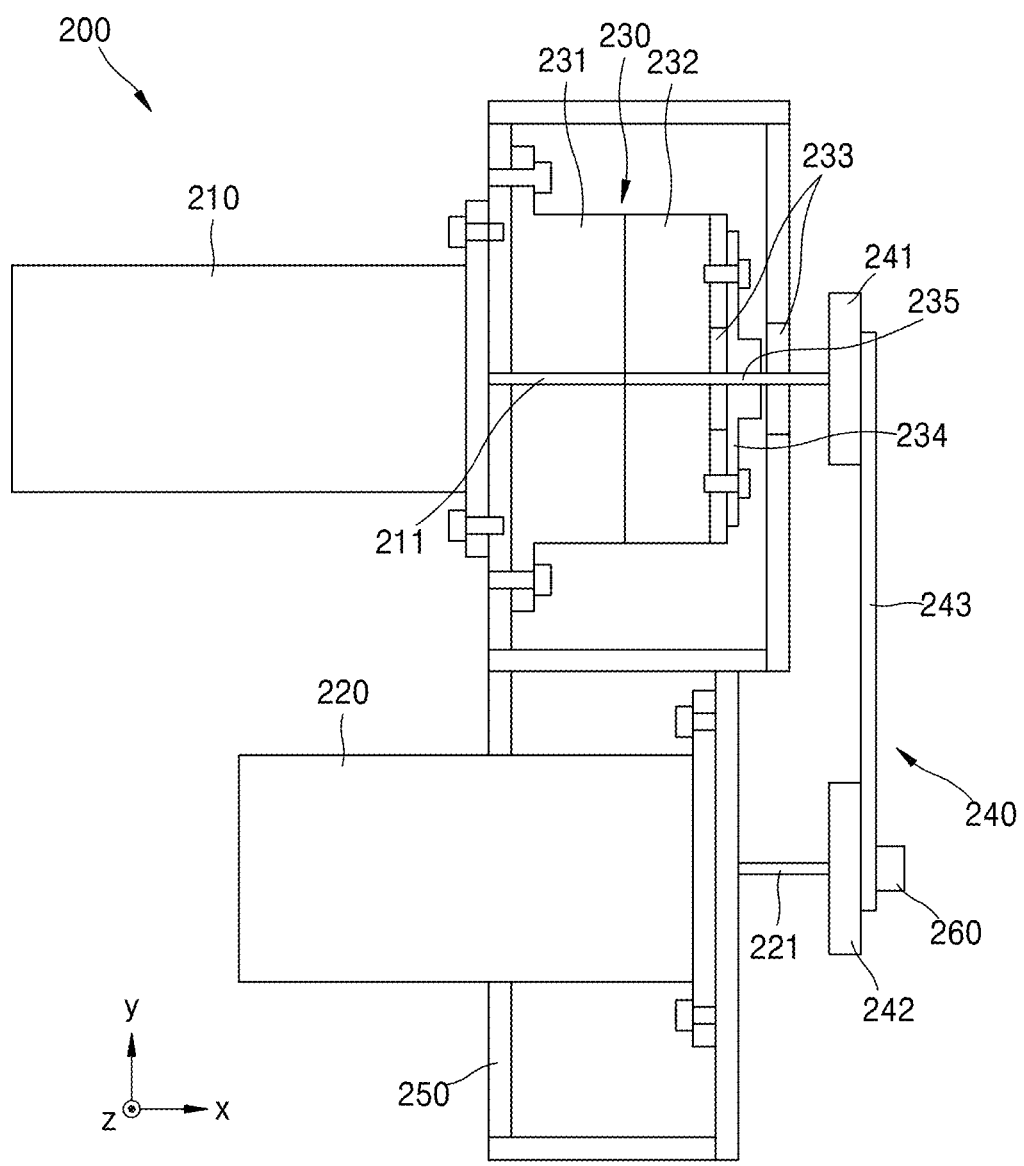
FIG. 5 is a detailed view of a second dual motor actuator according to an embodiment.
Figure 6:
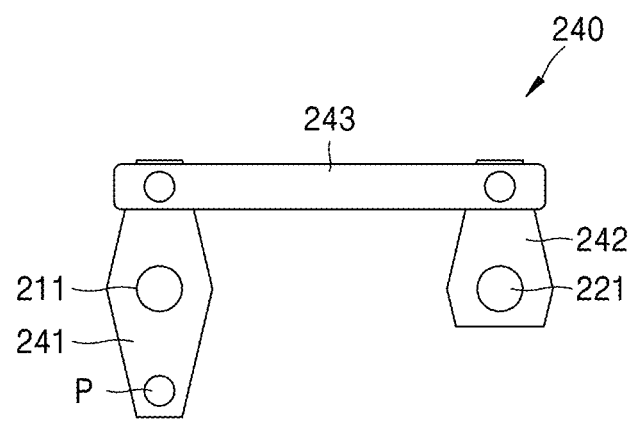
FIG. 6 is a diagram illustrating a second output unit in FIG. 5.
Figure 6:
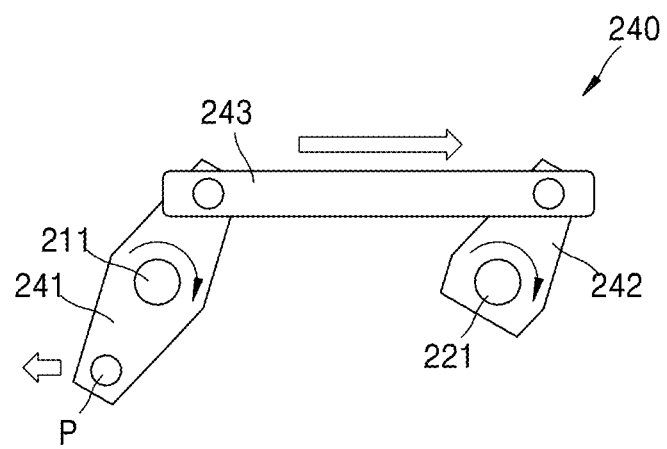

FIG. 4 is a conceptual diagram of the second dual motor actuator 200 according to another embodiment, FIG. 5 is a detailed view of the second dual motor actuator 200 according to an embodiment, and FIG. 6 is a diagram illustrating a second output unit 240 in FIG. 5. Referring to FIGS. 4 to 6, like the first dual motor actuator 100, the second dual motor actuator 200 according to an embodiment may include may include the second main motor actuator 210, a second main output shaft 211, a second auxiliary motor actuator 220, a second auxiliary output shaft 221, a second clutch 230, a second fixed clutch 231, a second movable clutch 232, and a second angular displacement gauge 260.

In the second dual motor actuator 200 according to an embodiment, unlike the first dual motor actuator 100, the second main motor actuator 210 and the second auxiliary motor actuator 220 may be arranged and installed in a parallel direction. Referring to FIG. 4, the second main motor actuator 210 is controlled by a torque output $T_1$ and an angular velocity $\omega$, and the second clutch 230 is connected to a second output shaft of the second main motor actuator 210 and transmits torque through the second output unit 240. In addition, when the second main motor actuator 210 is not driven due to a failure or the like, the second auxiliary motor actuator 220 is driven and controlled by a torque output $T_2$ and an angular velocity $\omega$. The second output unit 240 may be controlled with the same angular velocity $\omega$ even when driven by either the second main motor actuator 210 or the second auxiliary motor actuator 220. To this end, output ends of the second main motor actuator 210 and the second auxiliary motor actuator 220 may be connected by the second output unit 240 including a link.

Because an equation of motion of the second dual motor actuator 200 may be understood as the same as that of the first dual motor actuator 100, the description thereof is omitted.

Referring to FIG. 5, the second dual motor actuator 200 according to an embodiment is then described. The second main motor actuator 210 and the second auxiliary motor actuator 220 may be installed on a second base 250 through a joint bracket 151 so that a main output shaft and an auxiliary output shaft face each other. Therefore, the second base 250 is formed in a multi-layered shape as shown in the FIG. and the second main motor actuator 210 and the second auxiliary motor actuator 220 may be respectively installed and fixed on respective layers. At this time, the second main output shaft 211 and the second auxiliary output shaft 221 may be installed to be rotatably supported. A distance between the second main motor actuator 210 and the second auxiliary motor actuator 220 may be fixed by being fixed to the second base 250, and the second clutch 230 may also be movably installed and fixed.

The second clutch 230 may be installed to connect the second main output shaft 211 of the second main motor actuator 210 and the second auxiliary output shaft 221 of the second auxiliary motor actuator 220 to each other. The second dual motor actuator 200 differ from the first dual motor actuator 100 in that the second clutch 230 may be connected to the second auxiliary motor actuator 220 by a link in a spaced apart state without the second movable clutch 232 being directly connected to the second auxiliary output shaft 221. Accordingly, the second clutch 230 may include a guide shaft 235 guiding movement and transmitting power over a range in which the second movable clutch 232 operates. In addition, the guide shaft 235 may be rotatably supported by the second movable clutch 232 and the second base 250 through a second bearing 233. Furthermore, the second clutch 230 may include a second clamping unit 234 to firmly support the second movable clutch 232 to the second base 250. The second clutch 230 may also be driven by an excitation method, and accordingly, when the second main motor actuator 210 is driven in a state where the second movable clutch 232 is coupled to the second fixed clutch 231, torque may be output through the second main output shaft 211, the second fixed clutch 231, and the second movable clutch 232. On the contrary, when the second main motor actuator 210 is stopped by being diagnosed as a failure or the like, the second movable clutch 232 may be released from the second fixed clutch 231, the second auxiliary motor actuator 220 may be driven, and torque may be output from the second auxiliary output shaft 221 through a connection link 243 and the second movable clutch 232.

Also, referring to FIG. 6, the second dual motor actuator 200 may have a different structure of an output unit as an arrangement of the output unit is different from that of the first dual motor actuator 100. The second output unit 240 may include a main output link 241 linked to the second main output shaft 211, an auxiliary output link 242 linked to the second auxiliary output shaft 221, and the connection link 243 connecting the main output link 241 and the auxiliary output link 242 to each other. All of these parts may be an actual output part P, and it is indicated in the drawing that the actual output part P is formed on the main output link 241. Also, although the shapes of the main output link 241 and the auxiliary output link 242 are different in the drawing, the main output link 241 and the auxiliary output link 242 may be identically formed. However, as shown in the drawing, a distance of a connection point between the second main output shaft 211 and the connection link 243 and a distance of a connection point between the second auxiliary output shaft 221 and the connection link 243 may be formed to be the same. In this case, angular displacements of the second main output shaft 211 and the second auxiliary output shaft 221 may be linked in the same way.

In addition, the second dual motor actuator 200 may include the second angular displacement gauge 260 and a controller, which may be configured the same as those of the first dual motor actuator 100. However, when controlling the second auxiliary motor actuator 220 with a feedback value as the second main motor actuator 210 and the second auxiliary motor actuator 220 are installed in a parallel direction, an angular displacement $\theta_c^2$ output by an auxiliary motor of the second auxiliary motor actuator 220 may be controlled as an actual angular displacement $\theta_i^{i+1}$ of the first output unit 140 at a time of failure diagnosis. That is, $\theta_c^2$ is formed as a positive number, unlike that of the first dual motor actuator 100. This is because rotation directions of the main motor and the auxiliary motor are the same. Here, controlling with the angular displacement $\theta_c$ or $\theta_c^2$ means controlling an auxiliary motor to form an angular displacement on an auxiliary output shaft.

Figure 7:
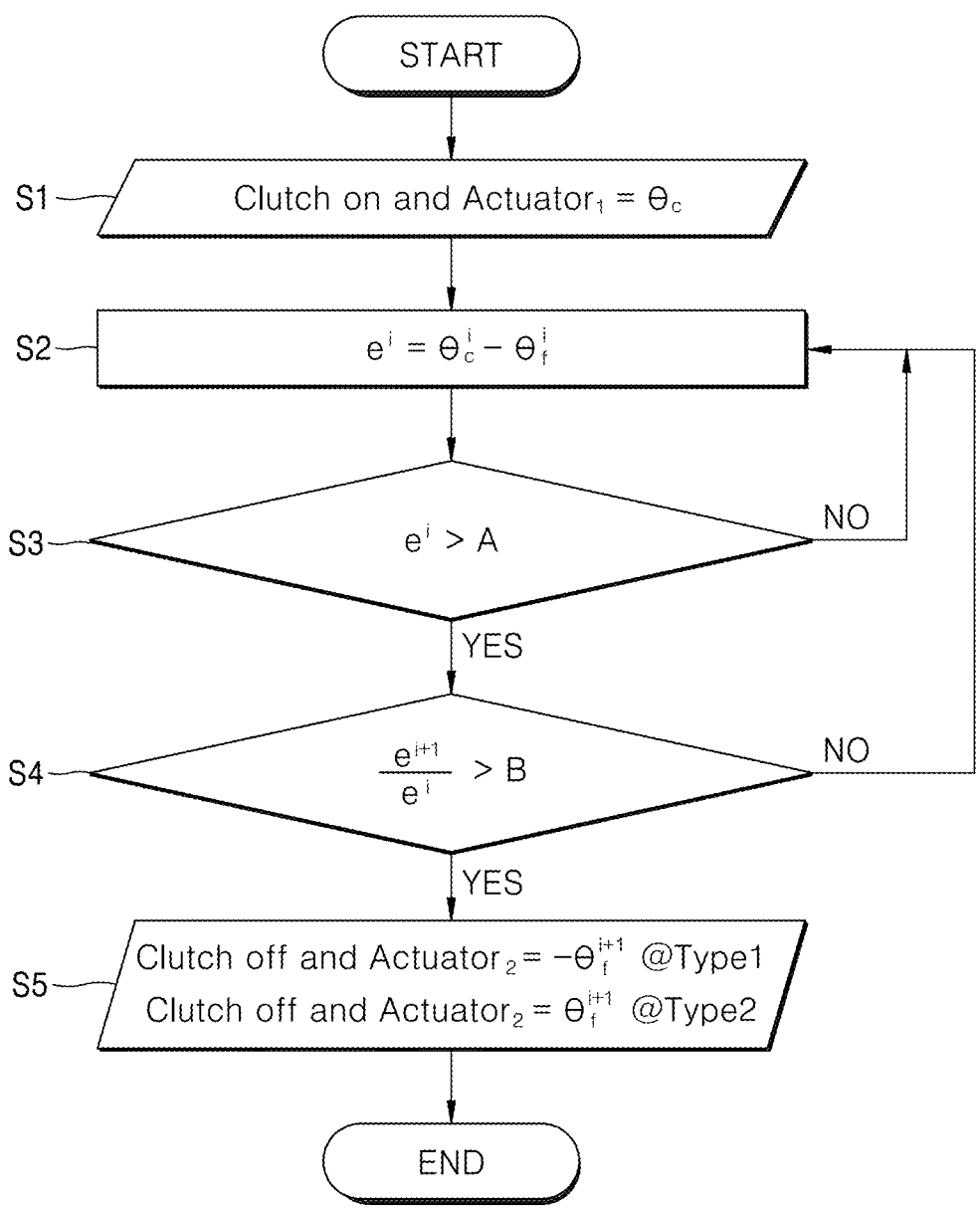
FIG. 7 is a flowchart illustrating a method of controlling a dual motor actuator according to an embodiment.

Hereinafter, an embodiment of a method of controlling a dual motor actuator according to an embodiment is described. FIG. 7 is a flowchart illustrating a method of controlling a dual motor actuator according to an embodiment. Referring to FIG. 7, the method of controlling a dual motor actuator according to an embodiment may include diagnosing a failure of a main motor actuator and operating an auxiliary motor actuator when diagnosing a failure.

In more detail, the method of controlling a dual motor actuator may include applying power supply to a clutch and operating the main motor actuator with an angular displacement $\theta_c$(S1), measuring an angular displacement of an output unit connected to the clutch to determine whether the main motor actuator is failed (S2 to S4), and, when the main motor actuator is diagnosed as a failure, cutting off the power supply to the clutch and operating the auxiliary motor actuator connected to the clutch (S5). When the power supply is cut off to the clutch, the clutch may be separated from the main motor actuator and transmit a driving force of the auxiliary motor actuator to the output unit.

The determining of whether the main motor actuator is failed may include measuring an angular displacement $\theta_f$ of the output unit and calculating an absolute value of a difference between the angular displacement $\theta_c$ of a main motor and an actual angular displacement $\theta_f$ of the output unit as an error angle $\theta^i$ (S2). That is, $e^i = |\theta_c^i - \theta_f|$. Then, the determining of whether the main motor actuator is failed may include determining whether the error angle $e^i$ is greater than a set value A (S3). When it is not determined that $e^i > A$, the main motor actuator may not be determined as a failure, and the error angle may be continuously calculated. The determining of whether the main motor actuator is failed may include, when it is determined that $e^i > A$, determining whether a rate of change of an error angle is greater than a set value B (S4). Here, B may be a number greater than 1. Accordingly, it may be determined whether the rate of change of the error angle increases at a certain rate or more. When it is not determined that $(e^{i+1})/e^i > B$, the main motor actuator may not be determined as a failure, and the error angle may be continuously calculated. When it is determined that $(e^{i+1})/e^i > B$, the main motor actuator may be diagnosed as a failure, and power supply may be cut off to the clutch, and the auxiliary motor actuator may be operated (S5).

Also, in the operating of the auxiliary motor actuator (S5), the auxiliary motor actuator may be controlled by an angular displacement $\theta_f^{i+1}$ of the output unit. That is, the auxiliary motor actuator may be controlled to output the angular displacement $\theta_f^{i+1}$. Here, controlling with the angular displacement $\theta_c$ or $\theta_c^2$ means controlling an auxiliary motor to form an angular displacement on an auxiliary output shaft. According to an arrangement relationship between the main motor actuator and the auxiliary motor actuator, in the first dual motor actuator 100, the first auxiliary motor actuator 120 may be controlled by $-\theta_f^{i+1}$, and in the second dual motor actuator 200, the second auxiliary motor actuator 220 may be controlled by $\theta_f^{i+1}$, as described above.

As such, the disclosure has been described with reference to the embodiments shown in the drawings, but this is only an example. While the disclosure has been particularly shown and described with reference to exemplary embodiments thereof, it will be understood by those of ordinary skill in the art that various changes in form and details may be made therein without departing from the spirit and scope as defined by the following claims.

Particular technical details described in the embodiments are examples, and do not limit the technical scope of the embodiments. To briefly and clearly describe the description of the disclosure, descriptions of general techniques and configurations in the related art may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The disclosure is not limited to the described order of the steps. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of ordinary skill in the art without departing from the spirit and scope.

According to the objects described above, various effects including the following may be expected. However, the disclosure is not established when all of the following effects are exerted.

A dual motor actuator and a method of controlling the same according to an embodiment may allow one clutch to be connected to an auxiliary motor actuator when a main motor actuator fails, so that the dual motor actuator may be prevented from being inoperable, and problem situations in which the main motor actuator fails may be effectively responded to with a minimum structure.

Also, as the main motor actuator and the auxiliary motor actuator are fixed on a base, the clutch may be stably driven between the main motor actuator and the auxiliary motor actuator.

In addition, the auxiliary motor actuator may be controlled by an angular displacement of an output unit by including an angular displacement gauge, and it is possible to determine whether the main motor actuator fails by using an angular displacement measured by the angular displacement gauge. In particular, an accurate error diagnosis is possible by determining whether there is a failure by using not only an error angle but also a rate of change of an error angle.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A dual motor actuator comprising:
a main motor actuator outputting a torque to a main output shaft by comprising a main motor and a main reduction gear;
an auxiliary motor actuator outputting a torque to an auxiliary output shaft by comprising an auxiliary motor and an auxiliary reduction gear; and
a clutch connecting the main output shaft and the auxiliary output shaft to each other,
wherein the clutch comprises a fixed clutch connected to the main output shaft and a movable clutch coupled to or released from the fixed clutch and connected to the auxiliary output shaft, and
the dual motor actuator further comprises an output unit connected to the movable clutch and transmitting an output from the main motor actuator or the auxiliary motor actuator;
wherein a capacity of the main motor is greater than a capacity of the auxiliary motor, and
wherein a torque output of the main motor and a torque output of the auxiliary motor are set according to a equation below, $$T_1 = T_2 + (J_C + J_2)\dot{\omega}$$

where, $T_1$: a torque output of the main motor actuator, $T_2$: a torque output of the auxiliary motor actuator, $J_C$: a mass moment of inertia of the clutch, and, $J_2$: a mass moment of inertia of the auxiliary reduction gear.

2. The dual motor actuator of claim 1, wherein the fixed clutch comprises a tooth clutch, and is coupled to the movable clutch in a tooth-like engagement structure.

3. The dual motor actuator of claim 1, further comprising a base on which the main motor actuator and the auxiliary motor actuator are installed.

4. The dual motor actuator of claim 1, wherein, when the main motor actuator fails, the movable clutch is released from the fixed clutch, and the auxiliary motor actuator is driven.

5. The dual motor actuator of claim 4, further comprising an angular displacement gauge measuring an angular displacement of the output unit; wherein the auxiliary motor actuator is controlled by an angular displacement of the output unit measured by the angular displacement gauge.

6. The dual motor actuator of claim 5, wherein the main motor actuator is determined to be a failure when an error angle and a rate of change of the error angle are greater than set values, wherein the error angle is a difference between an angular displacement input to the main motor and an angular displacement measured by the angular displacement gauge.

7. The dual motor actuator of claim 1, wherein the main motor actuator and the auxiliary motor actuator are installed in a direction in which the main output shaft and the auxiliary output shaft face each other.

8. The dual motor actuator of claim 1, wherein the main motor actuator and the auxiliary motor actuator are installed in a direction in which the main output shaft and the auxiliary output shaft are parallel to each other.

9. The dual motor actuator of claim 8, wherein the movable clutch comprises a guide shaft receiving and outputting torque from the main output shaft, and the output unit comprises a main output link connected to the guide shaft, an auxiliary output link connected to the auxiliary output shaft, and a connection link connecting the main output link and the auxiliary output link to each other.

10. The dual motor actuator of claim 9, wherein the guide shaft is installed to be supported on the base by a bearing.

* * * * *